US006086003A

United States Patent [19]

Günter et al.

[11] Patent Number: 6,086,003
[45] Date of Patent: Jul. 11, 2000

[54] ROLL PRESS FOR CRUSHING ABRASIVE MATERIALS

[75] Inventors: Harald Günter, Freiberg/Sachsen; Werner Plagemann; Wolfgang Schütze, both of Bochum, all of Germany

[73] Assignee: Maschinenfabrik Koppern GmbH & Co. KG, Germany

[21] Appl. No.: 09/085,145

[22] Filed: May 26, 1998

Related U.S. Application Data

[62] Division of application No. 08/403,894, filed as application No. PCT/EP94/02394, Jul. 20, 1994, Pat. No. 5,755,033.

[30] Foreign Application Priority Data

Jul. 20, 1993 [DE] Germany ........................ 43 24 344

[51] Int. Cl.[7] ........................ B23P 15/00
[52] U.S. Cl. ........................ 241/235; 241/293
[58] Field of Search ........................ 241/293, 235

[56] References Cited

U.S. PATENT DOCUMENTS

| | | | |
|---|---|---|---|
| 254,199 | 2/1882 | Cosgrove | 241/293 X |
| 3,186,650 | 6/1965 | Dixon et al. | 241/300 X |
| 3,684,497 | 8/1972 | Wendler et al. . | |
| 4,114,322 | 9/1978 | Greenspan | 51/206 R |
| 4,485,961 | 12/1984 | Ekbom et al. | 228/193 |
| 4,499,156 | 2/1985 | Smith et al. | 428/614 |
| 4,676,843 | 6/1987 | Nazmy | 148/11.5 N |
| 4,763,828 | 8/1988 | Fukaya et al. | 228/124 |
| 4,854,496 | 8/1989 | Bugle | 228/193 |
| 5,009,359 | 4/1991 | Stover et al. | 228/175 |
| 5,165,613 | 11/1992 | Keller et al. | 241/293 X |
| 5,188,030 | 2/1993 | Puschnerat et al. | 101/348 |
| 5,203,513 | 4/1993 | Keller et al. | 241/293 X |
| 5,269,477 | 12/1993 | Buchholtz et al. | 241/293 |
| 5,470,524 | 11/1995 | Krueger et al. | 419/5 |
| 5,601,520 | 2/1997 | Wollner et al. | 492/33 |

FOREIGN PATENT DOCUMENTS

| | | |
|---|---|---|
| 0 271 336 | 6/1988 | European Pat. Off. . |
| 0 516 952 | 12/1992 | European Pat. Off. . |
| 21 33 300 | 3/1972 | Germany . |

OTHER PUBLICATIONS

Patent Abstracts of Japan, vol. 011, No. 057 (M–564) Feb. 21, 1987 & JP,A, 61 219 408 (Nakagawa Yoshihiro) Sep. 29, 1986, see abstract.

Database WPI, Week 7421, Derwent Publications Ltd., London, GB; AN 74–39646V & SU,A, 393 042 (UKR Superhard Matls Cons), Dec. 27, 1973, see abstract.

*Primary Examiner*—David A. Scherbel
*Assistant Examiner*—Anthony Ojini
*Attorney, Agent, or Firm*—Skjerven, Morrill, MacPherson, Franklin & Friel, LLP

[57] ABSTRACT

The invention relates to a roll press, in particular for processing very abrasive materials, comprising at least two press rolls of which each includes a wear layer arranged on a basic body. The wear layer comprises substantially plane zones of a highly wear-resistant material while the spaces between the highly wear-resistant zones are filled with a material of different wear resistance. Furthermore, the material for the spaces is a composite material which is adapted to be sintered, and the highly wear-resistant zones are formed from hard bodies produced by hot-isostatic pressing. The material for the spaces and the material for the wear-resistant zones are bonded to the basic body in a hot-isostatic pressing process. The wear resistance of the composite material is substantially slightly greater or smaller than the wear resistance of the hard bodies in accordance with a desired profile which will obtained through wear.

22 Claims, 3 Drawing Sheets

ROLL PRESS FOR CRUSHING ABRASIVE MATERIALS

This application is a divisional of U.S. Ser. No. 08/403,894, filed May 3, 1995, now U.S. Pat. No. 5,755,033, issued May 26, 1998, which is a 371 of PCT/EP94/02394, filed Jul. 20, 1994.

FIELD OF THE INVENTION

The present invention relates to a roll press, especially for crushing very abrasive materials, comprising at least two press rolls of which each includes a wear layer arranged on a basic body, the wear layer comprising substantially plane zones of a highly wear-resistant material and the spaces between the highly wear-resistant zones being filled with a material of different wear resistance.

BACKGROUND OF THE INVENTION

Roll presses have been widely used in the technical field, and their intended uses can substantially be divided into three groups, i.e., briquetting, compacting and crushing. In all of the three applications the press rolls exert a more or less great pressure load on the materials to be processed. Depending on the profiles of the press rolls, there will be a sliding load on the roll surface in addition to the pressure load. The intensity of the sliding load substantially depends on the amount of the pressure load on the rolls, the profile of the roll surface and the properties of the materials to be processed. Such a load may cause severe wear on the rolls, especially in the case of great pressing forces.

High-alloy steels have especially been used in the prior art for reducing wear during briquetting and compacting, deposit welding during compacting and briquetting and crushing. With these kinds of wear protection, however, a considerable decrease in the service life was observed whenever especially strongly abrasive materials, such as glass powder, metallurgical slag or iron or non-ferrous metals had to be processed. As far as crushing is concerned, an autogenous wear protection is known in the case of which the roll surface is covered by particles of the material to be processed that are deposited into the spaces between knobs arranged on the roll surface. Such an autogenous wear protection is not suited for briquetting and does not prevent the embedded, fine-grained particles of the material to be processed from bursting. As far as deposit welding is concerned, there are restrictions imposed by the process with respect to the alloy composition of the welding material.

A generic roll press, especially a pulverizing roll, is known from EP-A-0516952. This document describes a roll press in which numerous basic bores into which pin-shaped material pieces are inserted are arranged in the circumferential area. The main part of a respective pin-shaped material piece is located in the basic roll body while the rest projects from the body. The spaces of the pin-shaped material pieces projecting in hedgehog fashion on the basic roll body can be filled with a ceramic material mixed with plastics. Since the wear-resistant material pieces wear normally at a slower pace than the material in the spaces, a profiled roll surface is formed during operation. The advantage is an improved introduction power and thus the achievement of increased throughput. The production of such known roll presses is, however, very time consuming due to the provision of the numerous basic anchorage holes in the basic roll body and thus entails great costs. Furthermore it is very likely that pins will escape with this type of solution.

SUMMARY OF THE INVENTION

It is the object of the present invention to provide a roll press of the above-mentioned kind which has a long service life and can be used for all kinds of applications (briquetting, compacting and crushing) and simply produced.

The object of the invention is attained in that the material for the spaces is a composite material which is adapted to be sintered, and that the highly wear-resistant zones are formed from hard bodies made by hot-isostatic pressing, the material for the spaces and the material for the wear-resistant zones being bonded to the basic body in a hot-isostatic pressing operation, and the wear resistance of the material for the spaces being substantially slightly greater or smaller than the wear resistance of the hard bodies in accordance with a desired profile which will obtained by wear.

Hence, the wear layer according to the invention is a powder-metallurgical hard layer which comprises plane zones and filled spaces with respectively different wear characteristics. After a certain time of use one will obtain a profile on the roll surface that effects the desired improved introduction of the material to be processed. Since the material for the zones and the composite material are each materials to be made in a powder-metallurgical process, the materials can be applied to the basic roll body by way of hot-isostatic pressing. The hot isostatic pressing operation ensures that the whole wear layer establishes a connection with the basic roll body of such a strength that individual components of the wear layer cannot be removed therefrom. Although powder-metallurgical hard layers which have been produced by hot-isostatic pressing are known in the prior art, these have never been used as wear layers in roll presses. The reason for this lies obviously in the relatively rough working conditions for the roll presses, since powder-metallurgical hard materials are relatively sensitive to impact. Such stresses, however, can easily be intercepted through the inventive arrangement of zones and spaces of different wear characteristics on a relatively tough basic body. The insensitivity to impacts can especially be improved in that either the material for the hard bodies or the material for the spaces is surrounded by a relatively ductile material. Furthermore, anchorage of specific components of the wear layer in the basic roll body, as is intended in the prior art, is no longer necessary in the case of hot-isostatic bonding. The scope of application of roll presses can considerably be increased through the achievement of longer service lives in the case of the use of a powder-metallurgical wear layer with different wear resistance of the zones.

The achievement of the invention is equally suited for the briquetting, compacting or crushing of very abrasive materials, with the service life being considerably increased. Any desired shape can be imparted to the wear layer in a simple manner by producing the hard layer in a hot-isostatic pressing process. Furthermore, such a wear layer can be made in one operation; that is why time and costs for making such a roll press can be reduced.

To form a corresponding profile during operation that is adapted to a specific material to be processed, the ratio between the wear resistance of the composite material and the wear resistance of the hard bodies can each be adapted to the abrasive material to be processed. This does not present any great problems, especially during production of such a wear layer, since the powder-metallurgical materials can be adapted to each other in their composition in accordance with the specific application. The total level of wear resistance of the two materials can here be raised or lowered.

On their circumference embedded in the composite material, the hard bodies are preferably integrally connected to the composite material at least in portions. Such a connection can automatically be achieved through hot-isostatic pressing and can therefore be put into practice very easily. At their points of contact, the hard bodies and the material for the spaces have each a diffusion area which establishes a very strong bond of the two materials.

During operation of the roll press an optimum profile can be attained in that the area of the hard bodies occupies about 60% to 90% of the total surface of the active wear layer. Active wear layer means here the area of the wear layer which takes part in the processing operation of the abrasive materials.

The highly wear-resistant zones can especially easily be made when the hard bodies have the form of small plates. Such plate-like hard bodies may, for instance, be applied to the roll body in advance and the spaces may then be filled with composite material. The shape of the platelike hard bodies may have any desired configuration.

Advantageous wear characteristics of the wear layer will in particular be obtained when the material for the hard bodies and the material for the spaces have a carbide content of up to 65%.

A size of the area of a wear-resistant zone of about 1 to 20 $cm^2$ helps to improve the profile.

Furthermore, the service life will be increased considerably when the wear layer includes ceramic components.

The wear layer preferably has a very fine-grained structure, whereby increased strength, hardness, toughness and notched bar impact work are achieved.

In a preferred embodiment, the wear layer is applied to the whole surface of the working area of the press roll in a planar manner. Preferred is also an arrangement in which the wear layer is arranged between surrounding webs which laterally define the working area and extend radially to the outside relative to the basic roll body. The hard layer is thereby surrounded on its edge by a bordering formed by the webs, which prevents the lateral edges of the hard layer from escaping because of impact or edge loads.

In accordance with another development, a plurality of pocket-like recesses which are substantially uniformly distributed on the circumference and in which the wear layer is respectively received are provided in the outer casing of the basic roll body in the working area of the press roll. With such a development, a corresponding size and area distribution of the wear layer can be achieved on the roll circumference in response to the respective application.

In particular, the press roll may have a profiled surface, preferably a briquette profile. The wear layer specifically withstands the sliding movements on the surface of the individual briquette profiles in the press roll, whereby a desired shape tolerance can be provided during a considerable service life.

In another embodiment, the basic roll body advantageously comprises a substantially cylindrical reception area the circumference of which has detachably arranged thereon a plurality of basic body segments which carry the powder-metallurgical wear layer on the outside. The wear layer can thus be made in an especially simple manner even in the case of relatively large diameters of the press rolls Moreover, it is ensured in each segment that the wear layer exhibits a uniform distribution of highly wear-resistant zones and spaces, since its dimension can be chosen in accordance with the most advantageous production conditions for hot isostatic pressing. This can be done in response to the number of the segments used. The basic body segments preferably form a closed ring around the reception area.

In another embodiment, the wear layer is applied to a continuous lining which is arranged on the basic roll body in a positive or frictionally engaged manner. The hard layer can thus be arranged on the basic roll body with relatively small efforts owing to such a design. The formation of cracks caused by shrinkage strains can be avoided, especially in the case of a shrunk-on lining, through a corresponding adjustment of the material, especially a ductile material, of the webs.

Furthermore, protection is sought for a method of producing a wear layer, in particular for a press roll for processing very abrasive materials. The method comprises the following steps:

a) applying a highly wear-resistant material to a base member, such as a basic roll body, whereby substantially plane and uniformly distributed zones are formed;
b) filling the spaces between the plane zones with a wear-resistant composite material;
c) applying the material for the zones and the material for the spaces to the base member in a hot-isostatic pressing process.

The method has the advantage that a wear layer which has very different wear characteristics can be made by simply changing a few method or material parameters. That is why the wear layer of a press roll can, for instance, be adapted in its wear characteristics to the abrasive material to be processed.

In another variant of the method, hard bodies can be made from the highly wear-resistant material in a hot-isostatic pressing process prior to application to the base member. The hard bodies can thus be shaped in any desired manner and applied to the base member in accordance with the profile desired at a later time.

It is however also possible to make hard bodies from the highly wear-resistant material in the hot-isostatic pressing process for applying the zone material to the base member. This means that just a single hot-isostatic pressing process has to be performed for simultaneously making hard bodies and for bonding these together with the composite material to the base member.

The hot-isostatic pressing operation can advantageously be controlled such that the wear resistance of the hard bodies and the wear resistance of the composite materials filling the spaces differ only slightly from each other, the wear resistance of the hard bodies being greater or smaller than the wear resistance of the material for the spaces in response to the desired profile which will be obtained by wear. Since the wear resistances differ only slightly from each other, it is ensured that the whole wear resistance of the wear layer is relatively great, and that a profile for improving the introduction of the abrasive material to be processed will nevertheless be obtained.

Furthermore, the wear resistance can be set accordingly through the respectively supplied content of hard phases in the material for the hard bodies or in the composite material. Hence, the wear characteristics of the zones and of the filled spaces can be adjusted by way of simple and different mixing ratios of the selected powder-metallurgical materials, whereby the wear characteristics of the wear layer will also change on the whole.

Embodiments of the present invention shall now be explained in more detail with reference to a drawing, in which:

DETAILED DESCRIPTION

Figure 1:
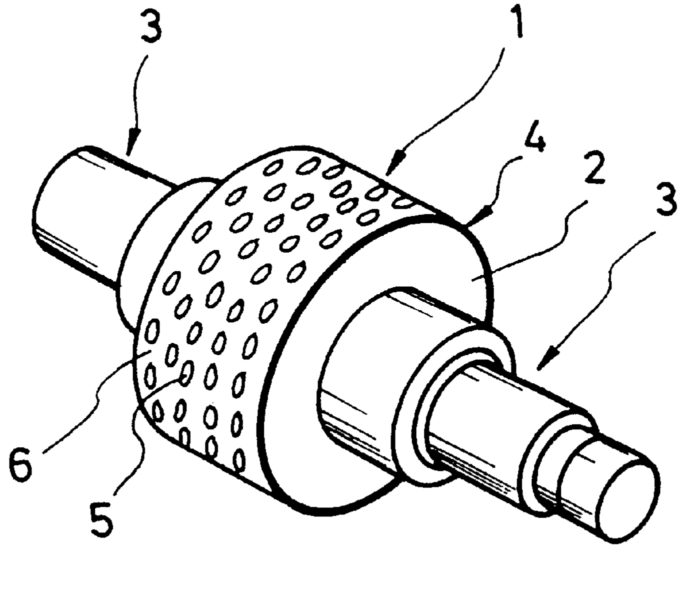
FIG. 1 shows a press roll for a roll press according to the invention.

FIG. 1 shows a press roll 1 which is intended together with a press roll of identical construction (not shown) for use in a roll press for compacting or crushing very abrasive materials. Press roll 1 consists essentially of a cylindrical basic roll body 2 which has provided thereon at both sides coaxially arranged journals 3. As a wear protection, press roll 1 comprises a powder-metallurgical wear layer 4 which is arranged on basic body 2 and has been produced by hot-isostatic pressing. The wear layer consists of zones 5 of a highly wear-resistant material and of a wear-resistant composite material that fills spaces 6 between zones 5. The wear characteristics of zones 5 and spaces 6 are adapted to the property of the abrasive material to be processed. Zones 5 and spaces 6 exhibit different wear characteristics, resulting in a surface profile of the press rolls 1 during operation of the roll press. Zones 5 are formed by hard bodies 7 (see FIG. 3) which have been made in a hot-isostatic pressing process. The wear resistance of such hard bodies 7 is defined by the hot-isostatic pressing operation and the material composition of the powder-metallurgical material. The hard bodies 7 extend down to the circumference of the basic roll body 2. As already mentioned, spaces 6 are filled by a composite material the wear characteristics of which are also defined by a hot-isostatic pressing operation and by the powder-metallurgical material composition of the composite material. The composite material and the hard bodies 7 are jointly bonded to the basic body 2 in a hot-isostatic pressing operation. Diffusion zones which effect a firm bond of the individual materials are thereby formed at the points of contact of the hard bodies 7 and the composite material and at the points of contact of the hard bodies 7 and the composite material with the basic roll body 2. Hence, the powder-metallurgical wear layer 4 has wear characteristics which are matched to the characteristics of the material to be processed. Highly wear-resistant powder-metallurgical materials which, for instance, may also contain ceramic components are preferably used as starting products for making wear layer 4. Furthermore, the carbide portion of the material for the hard bodies and of the material for the spaces may amount up to 65%. The combination of relatively tough basic roll bodies 2 with a very wear-resistant powder-metallurgical wear layer 4 which consists of zones 5 and spaces 6 with different wear characteristics leads to a relatively high wear resistance under the operating conditions prevailing in a roll press during operations such as briquetting, compacting and crushing. Such a press roll 1 for use in a roll press of the invention will withstand even great pressure loads acting on the powder-metallurgical wear layer 4, at a simultaneous sliding load along the roll surface. That is why press rolls 1 are especially well suited for compacting or crushing very abrasive materials, such as glass powder, metallurgical slag or iron or nonferrous metal ores.

The area of the highly wear-resistant zones 5 normally occupies about 60% to 90% of the total surface of the active wear layer 4. The size of the area of a wear-resistant zone 5 is normally between 1 and 20 $cm^2$.

A corresponding desired profile will thereby be obtained during later operation.

Figure 2:
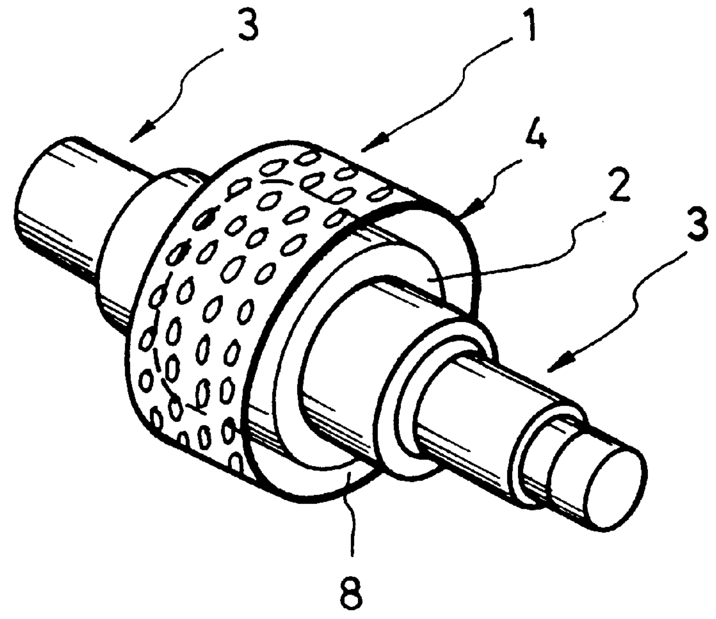
FIG. 2 shows a second embodiment of a press roll with lining.

FIG. 2 illustrates a press roll 1 which has arranged on the outer circumference of the basic roll body 2 a surrounding continuous lining 8 which is secured to the basic roll body 2 in a positive or frictionally engaged manner. Wear layer 4 is applied to the outer surface of lining 8. Since lining 8 serves as a support medium for wear layer 4, the wear layer can be mounted on the basic roll body 2 in an easy manner.

Figure 3:
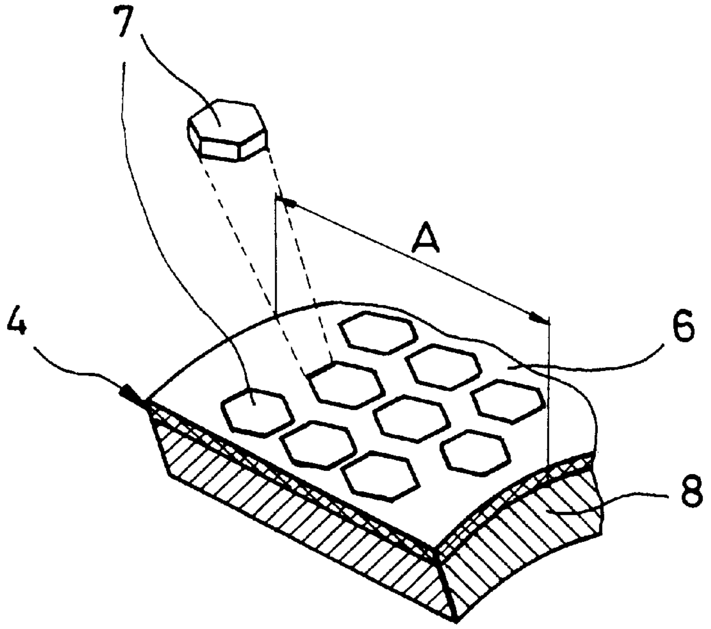
FIG. 3 is an enlarged view of part of the lining shown in FIG. 2.

FIG. 3 shows a section of lining 8 on the outside of which wear layer 4 extends over the whole working area A of wear roll 1. In this figure the platelike hard bodies 7 which have a hexagonal shape in the embodiment can very clearly be seen. The shape of the hard bodies 7, however, may have any desired configuration and can be selected according to the conditions of use.

Figure 4:
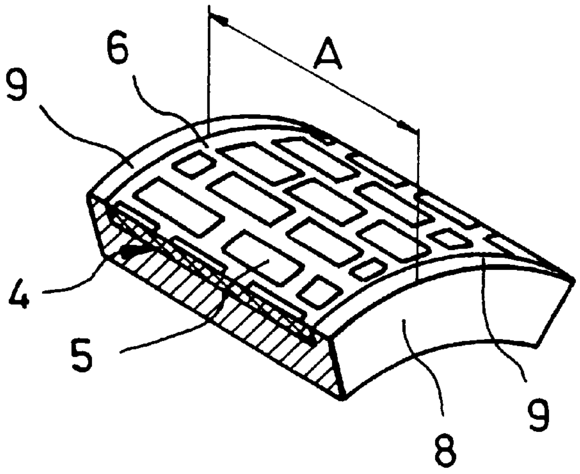
FIG. 4 shows a second variant of a lining.

A second variant of a lining 8 is shown in FIG. 4 in which the wear layer is arranged between surrounding webs 9 that laterally define the working area A. Webs 9 extend radially relative to the basic roll body 2 to the outside and have a height corresponding approximately to the thickness of wear layer 4. Wear layer 4 is completely enclosed laterally by webs 9, so that an escape of the sides due to excessive pressure load in the edge area is not possible.

It should here be noted that all embodiments of the wear layer 4, as are shown in FIGS. 3 and 4, can readily be transferred to the embodiment of a press roll 1 as shown in FIG. 1. The webs are here for instance directly worked from the basic roll body 2 without a lining 8 being interposed.

Figure 5:
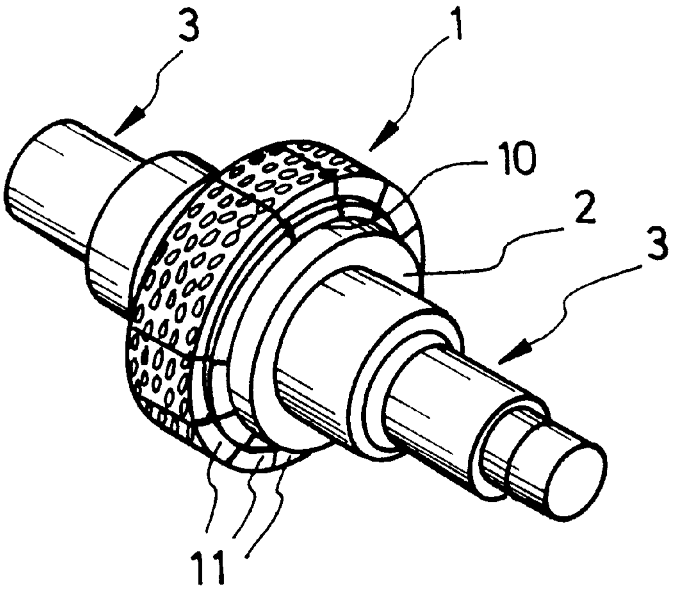
FIG. 5 shows a third embodiment of a press roll with basic body segments.
Figure 6:
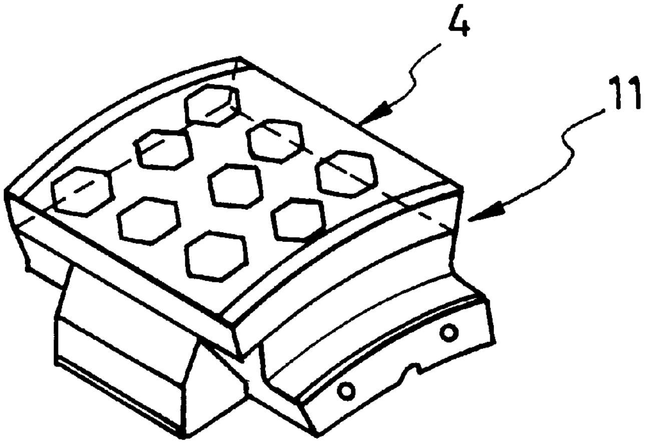
FIG. 6 is an enlarged view of a basic body segment shown in FIG. 5.

FIG. 5 shows a third variant of a press roll to be used in a roll press of the present invention, whose basic roll body 2 comprises a substantially cylindrical reception area 10 whose circumference has detachably arranged thereon a plurality of basic body segments 11 which carry wear layer 4 on the outside. The basic body segments 11 are positively mounted on the reception area 10 of the basic roll body 2. The basic body segments 11 form a closed ring around reception area 10. Segments 11 are interconnected by means of connection elements and in the manner of tongue-and-groove joints (see FIG. 6), so that a closed roll surface is formed on the outside. Wear layer 4 can then be arranged on the outside of segments 11 according to one of the variants of FIGS. 3 and 4.

The production methods for the wear layer for the inventive roll press shall now be explained briefly:

The method for producing wear layer 4 is characterized in that a highly wear-resistant material is first applied to the basic roll body 2, so that substantially plane and evenly distributed zones 5 are formed. The spaces 6 between the plane zones 5 are filled with a wear-resistant composite material in the next step. The material for the zones and the material for the spaces are then applied to the basic roll body 2 in a hot-isostatic pressing process. There are two variants of the method as to how the hard bodies 7 which form zones 5 can be made in a hot-isostatic pressing operation:

In the first variant the hard bodies 7 are made from the highly wear-resistant material in a hot-isostatic pressing operation prior to being applied to the basic roll body 2. This means that the platelike hard bodies 7 produced in this way can be provided on the basic roll body 2 in any desired arrangement and shape, with the spaces 6 being subsequently filled by a wear-resistant composite material. During the subsequent hot-isostatic pressing operation the composite material is then compacted in the spaces 6 accordingly and the whole wear layer 4 is applied to the basic roll body 2.

In the second variant of the method, the hard bodies 7 can be made from the highly wear-resistant material in the hot-isostatic pressing operation for application of the zone material. In this variant which is especially suited for producing a wear layer 4 on a basic body segment 11, a mold may be provided into which powder-metallurgical materials selected according to the desired composition are filled. The mold will then position the corresponding zone material and the space material on the base member. In the subsequent hot-isostatic pressing operation hard bodies 7 are made, the composite material is compacted in spaces 6 and the whole wear layer 4 is secured to the base member at the same time.

The hot-isostatic pressing operation can especially be controlled such that the wear resistance of the hard bodies 7 and the wear resistance of the composite material filling spaces 6 differ only slightly from each other. The respectively slightly less wear-resistant material area gives the respectively other material area sufficient support on the basic roll body 2 due to the only slightly different wear resistance. The wear resistance of the hard bodies 7 may be greater or smaller than the wear resistance of the material for the spaces, depending on the desired profile which will be obtained through wear. The selection of the respective variant will depend on the desired profile during later operation.

Furthermore, the wear resistance can be set very easily by correspondingly setting the respective content of hard phases in the hard body material and in the composite material. By selecting the individual material components of these powder-metallurgical composite materials, it is possible, especially in the second variant of the method, to apply different wear layers 4, which are correspondingly matched to the materials to be processed, to the basic member as rapidly as possible and without any expensive retrofitting of the machines. The provision of such a wear layer 4 on a tough base member leads to a combination which is very insensitive to impact or pressure, especially when very abrasive materials, such as glass powder, metallurgical slag or iron or nonferrous metal ores are processed. Especially with profiled press rolls 1, a powder-metallurgical wear layer 4 with different wear zones has long service lives although, apart from a great pressure load, there is a sliding strain on the surface. This will positively support the dimensional stability of the shapes provided on the roll surface. Furthermore, the present invention has the advantage that the "wear layer system" can be used in all cases of application, such as briquetting, compacting and crushing. This largely broadens the scope of application of the inventive roll press and simultaneously increases the service life.

We claim:

1. A roll press for processing abrasive materials comprising at least two press rolls, each of said rolls including a cylindrical roll body and a wear layer on the roll body, said wear layer comprising substantially plane zones of a pressed wear-resistant material and spaces between said wear-resistant zones, the spaces being filled prior to operation of the roll press with a sintered composite material of a wear resistance different from said wear-resistant zones, the material in said spaces and the wear-resistant zones being press bonded to said roll body, and the wear resistance of the composite material in said spaces differing from the wear resistance of said wear-resistant zones in accordance with a desired profile which will be obtained through wear.

2. The roll press according to claim 1, wherein the ratio of the wear resistance of said sintered composite material to the wear resistance of said wear-resistant zones is selected based on the abrasive material to be processed.

3. The roll press according to claim 1 wherein said wear-resistant material establishes an integral connection, at least in regions, with said composite material on a circumference of said wear-resistant zones as embedded in said composite material.

4. The roll press according to claim 1 wherein an area of said wear-resistant zones occupies about 60 to 90% of the total surface of said wear layer.

5. The roll press according to claim 1 wherein said wear-resistant zones are in the form of small plates.

6. The roll press according to claim 1 wherein the wear-resistant material and the composite material in said spaces have a carbide content of up to 65%.

7. The roll press according to claim 1 wherein the size of the area of the wear-resistant zones is about 1 to 100 $cm^2$.

8. The roll press according to claim 7 wherein the size of the area of the wear-resistant zones is from 10 to 20 $cm^2$.

9. The roll press according to claim 1 wherein said wear layer comprises ceramic components.

10. The roll press according to claim 1 wherein said wear layer has a very fine-grained structure.

11. The roll press according to claim 1 wherein said layer is applied in planar fashion to the whole surface of a working area of said press roll.

12. The roll press according to claim 11, wherein said wear layer is arranged between surrounding webs which laterally define said working area and extend radially to the outside relative to the roll body.

13. The roll press according to claim 12, wherein a plurality of pocket-like recesses which are substantially distributed in a uniform manner on the circumference of the roll body and in which said wear layer is respectively received are formed in the outer casing of said roll body in said working area of each of said press roll.

14. The roll press according to claim 1 wherein two press rolls have a profiled surface.

15. The roll press according to claim 14 wherein said profile is a briquette profile.

16. The roll press according to claim 1 wherein said wear-resistant zones have a hexagonal peripheral shape.

17. The roll press according to claim 1, wherein the wear resistance of the composite material in said spaces is greater than the wear resistance of said wear-resistant zones.

18. The roll press according to claim 1, wherein the wear resistance of the composite material in said spaces is less than the wear resistance of said wear-resistant zones.

19. The roll press according to claim 1, wherein said roll body has a substantially cylindrical reception area the circumference of which has detachably arranged thereon a plurality of body segments carrying said wear layer on their outside.

20. The roll press according to claim 19, wherein said body segments form a closed ring around said reception area.

21. The roll press according to claim 1, wherein said wear layer is applied to a continuos lining which is arranged on said roll body in a positive and frictionally engaged manner.

22. A roll press for processing abrasive materials comprising at least two press rolls, each of said rolls including a cylindrical roll body and a wear layer on the roll body, said wear layer comprising a first section of a first wear resistance and a second section of a second wear resistance, said first section comprising a wear-resistant material, said second section comprising a sintered composite material, said first and said second sections of said wear layer being hot-isostatic press bonded to said roll body, and said first wear resistance differing slightly from said second wear resistance in accordance with a desired profile to be obtained through wear.

* * * * *